UNITED STATES PATENT OFFICE.

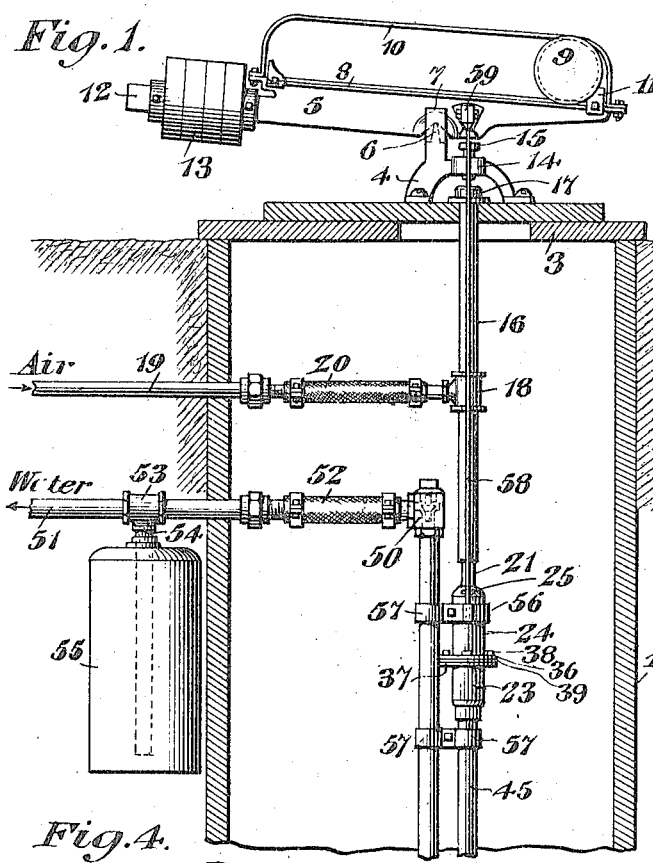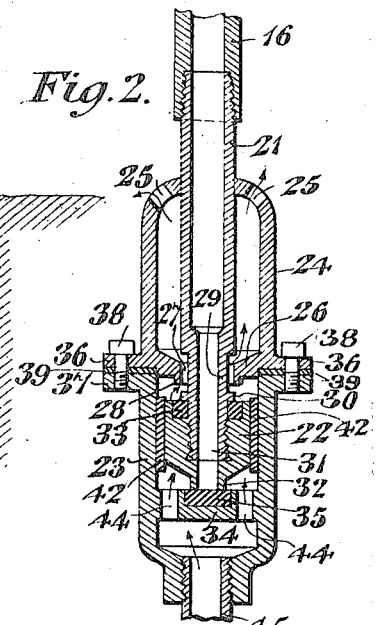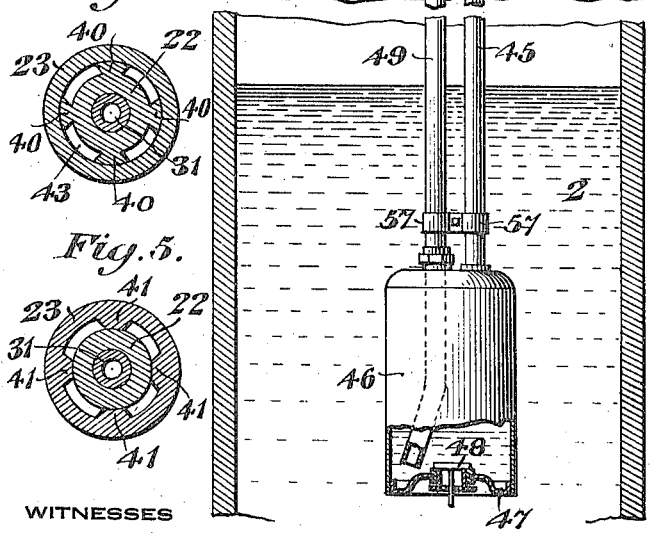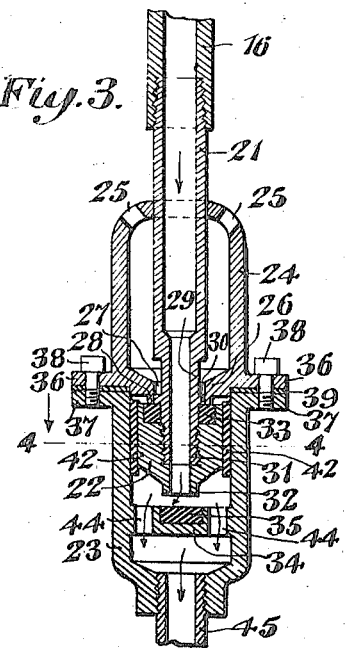

MADDRA J. HEWLETT, OF KEWANEE, ILLINOIS.

WATER-SUPPLY APPARATUS.

1,234,024.  Specification of Letters Patent.  Patented July 17, 1917.

Application filed August 15, 1916. Serial No. 115,006.

*To all whom it may concern:*

Be it known that I, MADDRA J. HEWLETT, a citizen of the United States, residing at Kewanee, in the county of Henry and State of Illinois, have invented a new and useful Water-Supply Apparatus, of which the following is a specification.

This invention has reference to water supply apparatus and its object is to provide a simple and efficient means for insuring a supply of water, under requisite pressure and without material waste, from wells or other reservoirs of water.

In accordance with the present invention there is provided a float chamber into and out of which water may flow when the float chamber is immersed in a supply of water, such as a well or the like, and the water chamber has associated with it counterweight and valve structures so arranged that when a supply of fluid, such as air, under pressure is coupled up with the float chamber, the fluid pressure so supplied will cause a flow of water from the float chamber to a point of utilization. When the water in the float chamber becomes exhausted, the supply of air under pressure is automatically cut off and the float chamber is replenished with water, after which the source of air under pressure is again put into communication with the float chamber to force the water therein to the point of utilization.

The invention is particularly applicable to household purposes, whereby without necessitating a supply tank for water, the structure is installed at a well or other suitable reservoir of water with an air tank appropriately located, so that air under pressure in the air tank will insure a supply of water under pressure to the house for a relatively long period of time before the air tank must be again replenished.

The invention will be best understood from a consideration of the following detailed description, taken in connection with the accompanying drawings forming part of this specification, with the further understanding that while the drawings show a practical form of the invention, the latter is not confined to strict conformity with the showing of the drawings, but may be changed and modified so long as such changes and modifications come within the scope of the appended claims.

In the drawings:—

Figure 1 is an elevation of the water supply system as installed in a well, some parts being shown in section and other parts broken away to reveal more distant parts.

Fig. 2 is a longitudinal diametric section of a valve structure employed in connection with the water system, showing the valve structure in position to cut off the supply of compressed air.

Fig. 3 is a view similar to Fig. 2, but showing the valve in position to admit compressed air to the water tank immersed in the well.

Fig. 4 is a section on the line 4—4 of Fig. 3, but showing a slightly modified form thereof.

Fig. 5 is a section similar to Fig. 4 but showing a still further modification.

Referring to the drawings there is shown in Fig. 1 a more or less schematic representation of a well 1 in which there is assumed to be a body 2 of water. The well is also shown as provided with a cover 3. The well 1 may represent any suitable tank or supply of water, but for convenience it will hereinafter be referred to as a well without limitation thereto.

Mounted on the cover 3 is a standard 4 carrying a rock lever 5 by means of a knife edge support 6 and guides 7, so that the lever is capable of rocking with little friction. The lever is in operation approximately horizontal and rocks about a substantially horizontal axis. On the upper edge of the lever is a track 8 for a roller 9 held to the track by a guard strip 10 connected at the ends to the track and in the main part parallel with the track. Secured to and adjustable along the track are end stop blocks 11, one at each end of the track, so that the extent of travel of the roller 9 may be adjusted as desired. At one end the lever 5 has an extension 12 carrying weights 13 sufficient in number for the purposes of the invention. Of course, a single weight might be used, but it is usually more convenient to employ several weights, so that the structure is readily adapted to different conditions by the removal of some of the weights or the addition of other weights. The standard 4 to one side of the knife edge 6 is provided with a boss 14 through which is threaded a stop screw 15.

Extending through the platform 3 in line with the stop screw 15 is an upright pipe 16 provided with a cap 17 so located as to engage the stop screw when the pipe is lifted to a certain extent, the pipe in the installed position being upright. At an appropriate point in the length of the pipe 16 there is included a T coupling 18 to one side of which there is connected a pipe 19 containing a section 20 of hose or other flexible material. The pipe 19 is assumed to be and in practice is connected with a source of air or other fluid under pressure, air being the customary fluid employed. At the lower end the pipe 16 has threaded into it a hollow valve stem 21 in turn carrying at its lower end a valve 22 movable in and lengthwise of a valve casing 23. At one end the valve casing 23 is provided with a cap member 24 which incloses a portion of the stem 21, and this cap member has outlet ports 25 near the upper end. At the lower end the cap member has its internal diameter reduced to an interior web 26 formed on the under side about a central opening 27 with a depending circular flange 28. The stem or pipe 21 extends through the opening 27 and there has a diametrically reduced portion 29 which below the opening 27 is provided with an interior circular flange 30. Below the flange 30 the pipe 21 has an exteriorly screw threaded extremity 31 threaded into the valve body 22 and the latter at the end remote from the pipe 21 is formed with an axially extended flange 32.

The valve body 22 is formed about the pipe 21 with a recess for a washer 33 of rubber or other suitable material held in the recess by the flange 30, which latter is of such diameter as to enter the passage 27, while the flange 28 is of a diameter to engage the washer 33 about the flange 30. Near the lower end of the valve casing 23 there is provided a spider 34 in which is located a valve seat 35 of rubber or other suitable material in the path of the flange 32. The valve casing 23 and cap portion 24 have outstanding meeting flanges 36, 37 at their meeting ends connected by screws 38 with interposed packing 39 between them. The valve body 22 is formed with spaced longitudinal ribs 40, as shown in Fig. 4, or the valve casing 23 has similar longitudinal interior ribs 41 as shown in Fig. 5, or the valve body 22 has spacing members 42 applied to it between the valve body and the interior wall of the casing 23, as indicated in Figs. 2 and 3. In either event the valve body 22 is sufficiently separated from the interior wall of the valve casing 23 to provide channels 43, while the spider 34 has passages 44 through it.

Connected to the lower end of the valve casing 23 is a pipe 45 of a sufficient length to lead below the surface of the water 2 and there enters a chamber 46 through the top of the latter. This chamber is provided with a bottom 47 in which is located a check valve 48 opening into the chamber from below. Entering the chamber 46 through the top is another pipe 49 leading to near the bottom of the chamber and carried to a suitable height in the well, and may stop short of the top thereof and of the pipe 19, although, of course, the pipe 49 may be continued to any desired height. At the upper end the pipe 49 carries an angle check valve 50 connected to a pipe 51 which may be of a length to lead from the well to a suitable point of utilization, say, to the spigots or outlets in the plumbing system of a house. Within the well the pipe 51 includes a short section 52 of rubber hose or other flexible material, and at an appropriate point the pipe 51 is provided with a T coupling 53 having a pipe 54 leading therefrom into an air bell 55. In the particular showing of the drawings the pipe 54 leads downwardly into the air bell 55 to near the bottom of the latter, but any suitable form of air bell may be employed.

In the position of the parts shown in Fig. 1 in which the controlling valve represented generally by the casing 23 is in the position shown in Fig. 3, the casing 46 may be assumed to be either wholly or partially filled with water. Under these circumstances air from the source of air under pressure is free to pass through the pipe 19 to the pipe 16, thence by way of the pipe 21 through the valve 22, which at this time is raised from the seat 35, thence through the passages 44 and pipe 45 into the chamber 46, any escape of the air by way of the valve 22 through the exhaust ports 25 being prevented by the washer 33 then bearing against the flange 28. Since the water in the chamber 46 is under constant air pressure, it is forced throughout the plumbing system of the house, and on opening any of the outlets water will flow therefrom under the pressure provided for at the source of air pressure. During this time the weight of water in the chamber 46, the weight of the chamber itself, the weight of the pipes connected to the chamber, and the weight 19 all contribute to hold the chamber in the lowered position shown in Fig. 1.

As water is drawn from the chamber 46 while more water cannot enter the chamber because of the air pressure acting through the water in the chamber upon the valve 48, the combined weight of the parts, together with the water in the chamber is lessened until finally the buoyancy of the chamber 46 due to the accumulated air therein is sufficient to overcome the weight of the chamber 46 and parts connected thereto, whereupon the chamber rises.

The valve casing 23 with its cap 24 is provided with a clip 56 having an eye 57 surrounding the pipe 49 and similar clips having eyes 57 connect and space the pipes 45 and 49, so that these pipes together with the valve casing are held together. The clip 56 is connected by stress rods 58 to clamp members 59 on the lever 5, so that any movement of the chamber 46 is transmitted through the pipe 45 and rods 58 to the lever 5 on that side of the pivot 6 of the lever at which the weight 9 is located under the conditions already assumed. The result is that the rising movement of the chamber 46 causes a rocking movement of the lever 5 until the track 8 slants away from the weight 9 to cause the latter to roll down the track toward the end of the lever carrying the weights 13, the latter counterbalance the moving parts to the desired extent, so that the buoyancy of the chamber 46 may cause the operation described. As soon as the weight 19 has passed the pivotal axis of the lever 15, its weight is added to that end of the lever carrying the weights 13, whereupon the lever rocks rapidly in a direction to lift the chamber 46, together with the valve casing 23. The friction of the parts may be sufficient to hold the pipe 16 from rising with the valve casing 23, whereupon the valve body 22 being held stationary, the valve seat 35 is quickly brought into engagement with the flange 32. Ultimately the movement of the parts is arrested by the engagement of the cap 17 with the stop screw 15. When the valve seat 35 is brought into engagement with the flange 32, the chamber 46 is cut off from communication with the source of air under pressure and the air escape of the chamber 46 is opened to the atmosphere by way of the pipe 45, ports or passages 44, passages 43, passage 27, the valve seat 33 having been moved away from closing relation to the passage 27, and exhaust ports 25. Now, the normal water pressure within the well is exerted upon the valve 48 to open it, whereupon the tank quickly fills with water, the valve 48 being made of relatively large area for the purpose. As soon as the entering water drives out the air from the chamber 46, its buoyancy correspondingly lessens until the weight of the parts is sufficient to overcome the weight 9, so that the lever 5 is rocked to the first position and the weight 9 rolls again to the first position, adding its weight to effect the lowering action of the chamber 46 quickly. As the lever 5 rocks to the first position the valve casing 23 is lowered and the pipe 16 participates in this movement until arrested by the engagement of the cap 17 with the well cover, or by the engagement of the valve seat 33 with the valve flange 28 about the opening 27. Now, the parts have returned to their first position and the supply of air under pressure is again automatically put into communication with the chamber 46, thus reëstablishing working conditions to supply water to the house.

To avoid any interruption in the service should it happen that water was being drawn in the house at the time the chamber 46 is being filled, the operation of the device establishes in the air bell 55 a supplemental supply which will furnish water for a sufficient period of time to bridge over the interval occupied in replenishing the chamber 46. When the pressure within the chamber 46 is diminished for replenishing purposes, the check valve 50 closes and hence the pressure within the air bell 55 and the house system beyond the air bell is maintained.

The stop screw 15 provides for a lost motion in the movements of the parts, which in practice has been found to be of great importance.

The present invention embodies the same general principles of operation as the water supply apparatus for which Letters Patent No. 1,125,319, were granted to me on January 19, 1915, and the present invention includes certain improvements in the structure shown in the aforesaid patent.

What is claimed is:—

1. In a water supply system, a buoyant chamber having means for the entrance of water thereinto and an outlet pipe for water entering the chamber, an air supply means connected to the chamber, gravity acting means for counteracting the tendency of the buoyant chamber to rise while emptying, and a two-part telescoping valve structure having one side connected to the buoyant chamber and to the gravity means and the other side having a limited range of movement independent of the first-named side of the valve.

2. In a water supply system, a buoyant chamber having means for the entrance of water thereinto and an outlet pipe for water extending therefrom, means for supplying compressed air to the buoyant chamber to cause the discharge of water therefrom, gravity means for counteracting the tendency of the buoyant chamber to rise while emptying, and a two-part telescoping valve included in the air supply means, one part of the valve being connected to the buoyant chamber and to the gravity member for movement thereby, and the other part of the valve having a range of movement independent of the first-named part of the valve with means for restricting said movement.

3. In a water supply system, a buoyant chamber having means for the entrance of water thereinto and an outlet pipe for conducting water therefrom, means for supplying compressed air to the buoyant chamber to cause the discharge of water therefrom, gravity means for counteracting the tendency of the buoyant chamber to rise while emptying and responsive to move in opposition to the action of gravity by the establishment of a predetermined degree of buoyancy in the buoyancy chamber, and a two-part telescoping valve in the air supply means comprising a valve casing with separated valve seats, a valve member reciprocable between the seats for closing and opening the portions of the valve controlled by the seats in alternation, and means for a limited lost-motion between the valve member and the valve body.

4. In a water supply system, a buoyant chamber having means for the entrance of water thereinto, and an outlet pipe for conducting water therefrom, an air supply pipe connected to the chamber and including a two-part telescoping valve, connections between the two pipes for the simultaneous movement thereof, said connections including one part of the valve and the other part of the valve being connected to a corresponding part of the air supply pipe and having a range of movement independent of the first-named part of the valve, and means controlled in one direction by gravity and in the other direction by the buoyancy of the buoyant chamber for operating the telescoping valve.

5. In a water supply system, a buoyant chamber having means for the entrance of water thereinto and means for the discharge of water therefrom, means for the supply of air under pressure to the buoyant chamber, means movable in one direction by gravity and in the other direction by the buoyant chamber, and a two part telescoping valve included in the air supply means with one part of the valve connected to the buoyant chamber and the other part connected to a corresponding part of the air supply means, the first-named part of the valve being under the control of the gravity means and buoyant chamber for actuation in opposite directions and the second part of the valve having a limited free movement independent of the buoyant chamber and gravity means, the valve having means for placing the air supply means in communication with the buoyant chamber in one position of the valve and for cutting off the air supply and connecting the chamber to the atmosphere in the other position of the valve.

6. In a water supply system, an air valve comprising a casing with spaced valve seats therein, a valve member inclosed by the casing and reciprocable between the seats and having separate ports therethrough, the valve casing on one side of the seats having means for connection with the point of utilization of air passing through the air valve and on the other side of the seats communicating with the atmosphere, and means exterior to the casing for bringing the valve member into engagement with one or the other of the valve seats to close the air supply and open the valve to the atmosphere or to open the air supply and close the valve to the atmosphere through a respective one or the other of the ports through the valve member.

7. In a water supply system dependent upon air pressure for its operation, a two-part telescoping valve for controlling the air supply with each part movable independently of the other, and means for positively moving one part of the valve and means for the limited movement of the other part of the valve independently of the first part and in response to movements of the first part of the valve.

8. In a water supply system dependent upon air pressure for its operation, a two-part telescoping valve for controlling the air supply with each part movable independently of the other, and means for positively moving one part of the valve and means for the limited movement of the other part of the valve independently of the first part and in response to movements of the first part of the valve, said valve comprising a casing with a cap member, the casing having a valve seat therein with air passages about the valve seat, the cap member having a valve seat with a passage therethrough, and ports for the escape of air to the atmosphere, and a reciprocable valve member with means for the passage of air therethrough from a source of supply, said reciprocable valve member being movable between the spaced valve seats and having air passages about the valve member, whereby in one position the valve member will open the valve to permit the passage of air from a source of air under pressure through the valve and at the same time close the valve to the passage of air to the atmosphere, and in the other position close the valve to the source of air supply and open the valve to the atmosphere.

In testimony that I claim the foregoing as my own, I have hereto affixed my signature in the presence of two witnesses.

MADDRA J. HEWLETT.

Witnesses:
STELLA L. STROUD,
HENRY L. DEMMLER.

Copies of this patent may be obtained for five cents each, by addressing the "Commissioner of Patents, Washington, D. C."